United States Patent [19]

Kazami

[11] Patent Number: 5,247,321

[45] Date of Patent: Sep. 21, 1993

[54] PHOTOGRAPHING INFORMATION RECORDING DEVICE FOR CAMERA

[75] Inventor: Kazuyuki Kazami, Tokyo, Japan

[73] Assignee: Nikon Corporation, Tokyo, Japan

[21] Appl. No.: 888,427

[22] Filed: May 28, 1992

Related U.S. Application Data

[63] Continuation of Ser. No. 726,293, Jul. 5, 1991, abandoned.

[30] Foreign Application Priority Data

Jul. 13, 1990 [JP] Japan .................... 2-185875

[51] Int. Cl.$^5$ .............................. G03B 17/24
[52] U.S. Cl. ...................... 354/106; 354/173.1; 354/214; 354/468
[58] Field of Search ............. 354/105, 106, 173.1, 354/173.11, 212, 214, 468, 484

[56] References Cited

U.S. PATENT DOCUMENTS 4,304,480 12/1981 Fukahori et al. .............. 354/173.11
4,705,372 10/1986 Lapeyre ........................ 354/106

FOREIGN PATENT DOCUMENTS 0435227  3/1991  European Pat. Off.
WO81/03228 12/1981  World Int. Prop. O.

OTHER PUBLICATIONS

Patent Abstracts of Japan, vol. 9, No. 250 (P-394) 8 Oct. 1985.

Primary Examiner—Michael L. Gellner
Assistant Examiner—Cassandra Spyrou
Attorney, Agent, or Firm—Shapiro and Shapiro

[57] ABSTRACT

Photographing information is stored for each exposed frame of film in a camera, and the stored information is read out and magnetically recorded at each frame during feeding of the film in a predetermined direction. If a film feeding failure occurs while information is being recorded, a film feed failure signal is generated, which causes the film to be fed in the opposite direction and then to be fed in the predetermined direction again for recording of information read out from storage.

4 Claims, 6 Drawing Sheets

PHOTOGRAPHING INFORMATION RECORDING DEVICE FOR CAMERA

This is a continuation of application Ser. No. 726,293 filed Jul. 5, 1991, now abandoned.

BACKGROUND OF THE INVENTION

1. Field of the Invention

The present invention relates to a photographing information recording device for a camera, capable of magnetically recording photographing data or information on a photographing film.

2. Related Background Art

Photographing information recording devices for cameras are known which are capable of recording photographing information such as trimming data and photographing data, for each of the exposure frames, on a magnetic recording medium applied to a film.

In this type of photographing information recording device, photographing information is recorded on a predetermined position on each exposed frame when the film is wound or fed by one frame after each exposure.

This known device, however, suffers from the following problems. Namely, recording of the photographing information may fail due to a film feed failure which may occur when the battery voltage has come down below a predetermined level or when the battery cover is accidentally opened during recording of the photographing information.

SUMMARY OF THE INVENTION

Accordingly, an object of the present invention is to provide a photographing information recording device for a camera which, in the event of a film feed failure occurring during recording of photographing information, conducts recording of the photographing information after recovery from such a film feed failure.

Another object of the present invention is to provide a photographing information recording device which, upon sensing occurrence of the film feed failure during recording of photographing information, produces a signal indicative of occurrence of the film feed failure.

In accordance with the invention, photographing information is stored for each exposed frame of film, and the stored information is read out and magnetically recorded at each frame during feeding of the film in a predetermined direction. If a film feeding failure occurs while information is being recorded, a film feed failure signal is generated, which causes the film to be fed in the opposite direction and then to be fed in the predetermined direction again for recording of information read out from storage.

It is therefore possible to record the photographing information on each frame of the film without fail.

The invention will be more fully understood from the following description of the preferred embodiment in conjunction with the accompanying drawings. It is to be understood, however, that the described embodiment is only illustrative and is not of limiting sense.

BRIEF DESCRIPTION OF THE DRAWINGS

FIGS. 2A to 2C are illustrations of a film which is used in combination with an embodiment of the present invention in which:

FIG. 2A shows the state of the film after completion of an exposure;

FIG. 2B shows the state in which a film feed failure has occurred after the commencement of the feed of the film; and FIG. 2C shows a state in which the film has been rewound to bring the frame on which the failure has occurred to the initial position;

DETAILED DESCRIPTION OF THE PREFERRED EMBODIMENTS

Figure 1:
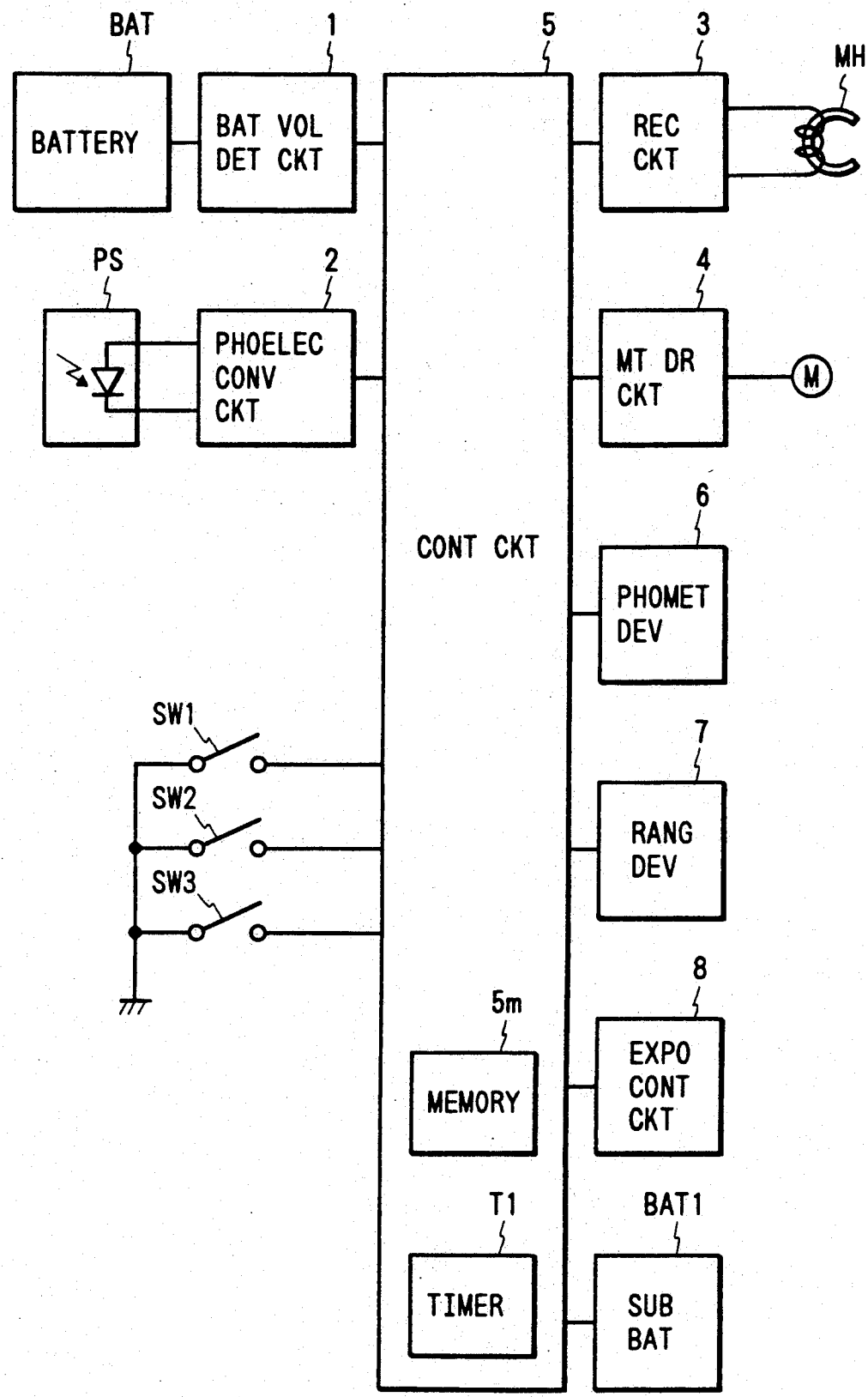
FIG. 1 is a block diagram of an embodiment of the present invention.

Referring to FIG. 1 which is a block diagram of an embodiment of the photographing information recording device of the present invention, a battery voltage detection circuit 1 detects any drop of the voltage of a battery BAT to a level at which a film feed motor stops operating, so as to cause film feed failure. A photoelectric conversion circuit 2 detects, in cooperation with a photoelectric device PS such as a photo-detector connected thereto, perforations of a photographing film. A recording circuit 3 records, by means of a magnetic recording head MH connected thereto, various items of photographing information on the film. A motor drive circuit 4 drives the film feed motor M so as to wind and rewind the film.

A switch SW1 is turned on when the shutter release is half-pushed, while a switch SW2 is turned on when the shutter release is fully pushed. A battery cover switch SW3 is adapted to be turned on when a cover of a battery compartment is opened.

A control circuit 5 is composed of a microcomputer and peripheral parts such as a memory 5m, and is capable of controlling the recording circuit 3 and the motor drive circuit 4 in accordance with signals from the battery voltage detection circuit 1, photoelectric conversion circuit 2 and the switches SW1 to SW3. The memory 5m includes the EEROM which retains its content even when the voltage of the battery BAT has come down to 0 V. This memory 5m is for storing photographing information. A timer T1 measures the time during feeding of the film and produces a film feed failure signal when the time is over during feeding. The control circuit 5 and the battery voltage detection circuit 1 are supplied with power from the battery BAT. In the event that the voltage of the battery BAT has come down below a predetermined level or completely to zero, a backup battery BAT1 supplies electrical power to the control circuit 5 so that the control circuit 5 can continue the operation for a predetermined time.

A photometric device 6 meters the light quantity in the image field and produces brightness information, while a range-finding device 7 measures the distance to the subject and produces range information. Numeral 8 denotes an exposure control device which controls a shutter release mechanism and a stop mechanism both of which are not shown.

Figure 2A:
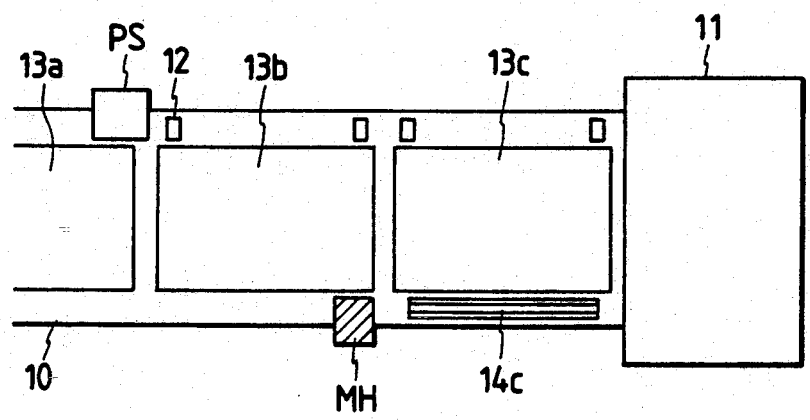
Figure 2B:
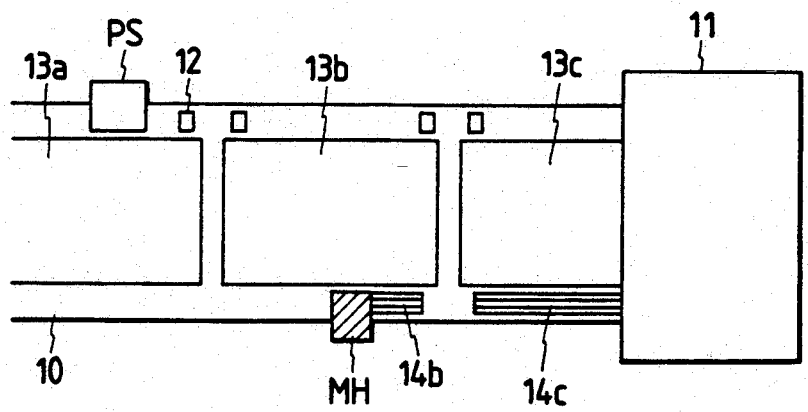
Figure 2C:
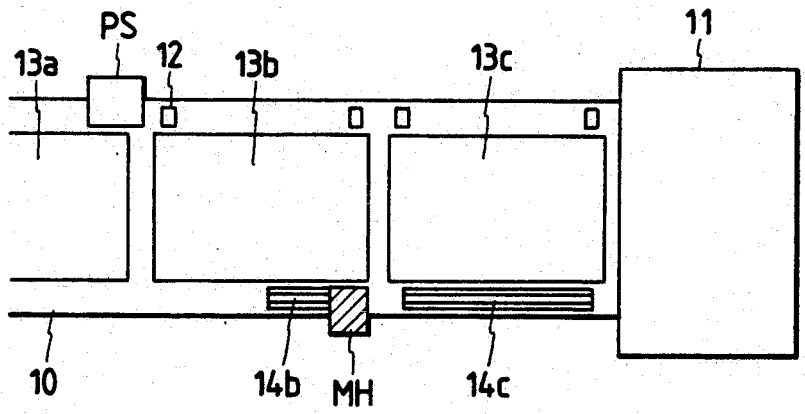

FIGS. 2A to 2C in combination show a film which is used in combination with the described embodiment. More specifically, the film 10 is adapted for use in a pre-wind type camera in which a newly loaded film is taken up by a take-up spool of the camera out of the film cartridge 11 in advance of the exposure. The film is then fed back to the film cartridge 11 frame by frame upon each exposure. Perforations 12, two for each frame, are formed in one marginal edge of the film 10. These perforations are sensed by the photoelectric device PS and the photoelectric conversion circuit 2 so that data is obtained to enable counting of the number of frames used and positioning of the new frame. A magnetic recording medium for recording photographing information for each frame is applied to the other marginal edge of the film 10.

Referring to FIG. 2A, the film 10 is in such a state that a frame 13b has just been exposed and an unexposed or new frame 13a is just going to be moved to a predetermined photographing position. Photographing information on the previously exposed frame 13c has been already recorded in the recording region 14c. In FIG. 2B, the feed motor M has stopped due to a voltage drop of the battery BAT immediately after the start of winding of the film from the state shown in FIG. 2A, thus causing film feed failure. As a result of the film feed failure, the photographing information concerning the frame 13b has been incompletely recorded in the recording region 14b. In FIG. 2C, the film has been rewound by the operation of the control circuit 5 so as to bring the frame 13b on which the film feed failure was detected back to the initial position which is the same as the position shown in FIG. 2A, i.e., the position where the exposure of the frame 13b was over and the film was just going to be fed.

Figure 3:
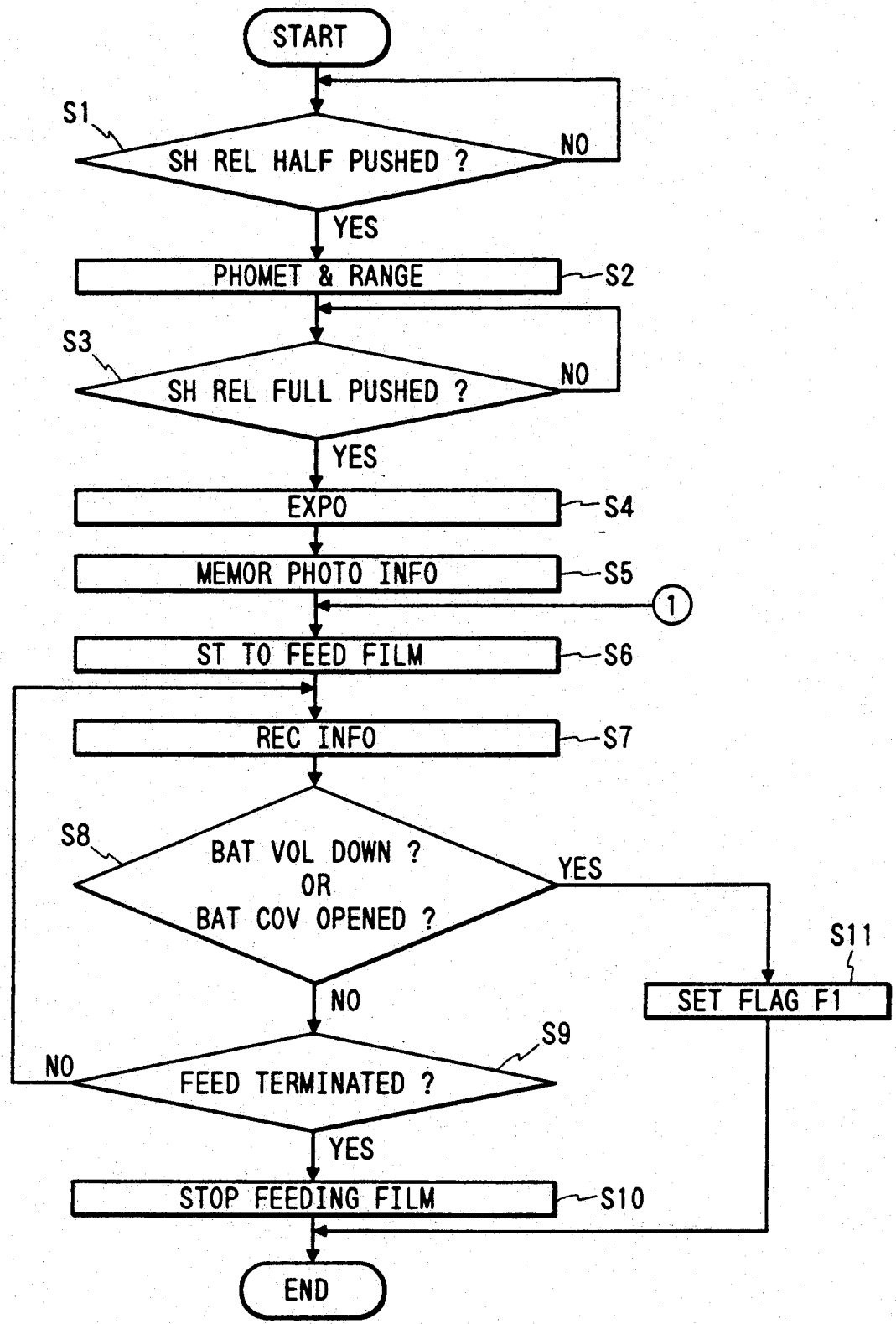
FIG. 3 is a flow chart showing a control program for recording the photographing information.

FIG. 3 is a flow chart showing the control program for recording the photographing information, executed by the control circuit 5. The operation of the photographing information recording device of the invention will be described mainly with reference to this flow chart. For an easier understanding of the description, it is assumed that film feed failure has occurred at the film position shown in FIG. 2B.

In Step S1, whether the shutter release has been half-pushed is determined by the switch SW1. This step is repeated until the half-push state of the shutter release is detected. When the half-push state of the shutter release is detected, the process proceeds to Step S2 in which the photometric device 6 is controlled to conduct photometry of the field. At the same time, the range finding device 7 is controlled to meter the distance to the subject to be photographed. In the subsequent step S3, whether the shutter release has been fully pushed is detected by the switch SW2. This step is repeated until the full push of the shutter release is detected. When full push state of the shutter release is detected, the process proceeds to Step S4 in which an exposure control device 8 is controlled to allow the frame 13b to be exposed.

In a subsequent step S5, photographing information such as trimming data, photographing date and so forth concerning the above-mentioned exposure is stored in the memory 5m. The process then proceeds to Step S6 in which the film feed motor M is started to feed the film 10 into the cartridge by a length corresponding to one frame, thereby to bring the next unexposed frame 13a to the predetermined photographing position. In Step S7, the photographing information stored in the memory 5m in the above-mentioned step is read out from the memory 5m and recorded in the recording region 14b annexed to the frame 13b while the film 10 is being fed. Step S8 is for detecting any failure such as drop of the voltage of the battery BAT or accidental opening of the battery cover. Any abnormal voltage drop of the battery BAT is detected by the battery voltage detecting circuit 1, while any accidental opening of the battery cover is detected by the switch SW3. In the event that a failure is detected in Step S8, the process jumps to Step S11, whereas, when no failure is detected, the process proceeds to Step S9 which determines whether the feed of the film 10 by one frame is over. If the feed of the film has been completed, the process proceeds to Step S10, whereas, if not, the process returns to Step S7. In Step S10, the motor drive circuit 4 is operated to stop the film feed motor M, thus terminating feed of the film.

As stated before, when a failure, i.e., an abnormal voltage drop of the battery BAT or an accidental opening of the battery cover, is detected in Step S8, the process proceeds to Step S11. In this step S11, the program is interrupted after a flag F1 is set to indicate occurrence of film feed failure during the feed of the film 10.

Figure 4:
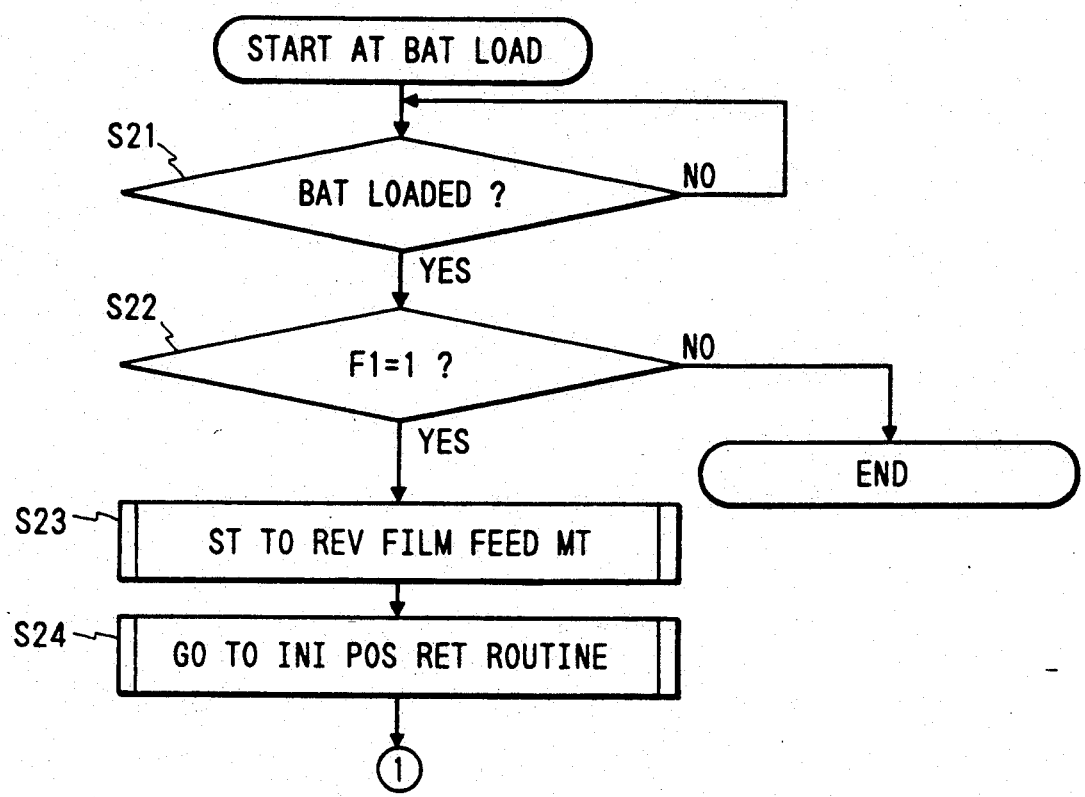
FIG. 4 is a flow chart of a control program which is executed after loading of a battery.

FIG. 4 is a flowchart showing a program which is executed when a new battery BAT is loaded.

In Step S21, whether the battery BAT has been loaded is determined. This step is executed repeatedly until the loading of the battery is detected. The detection is conducted by the switch SW3 which is operative in response to the state of the battery cover. When the loading of the battery BAT has been detected, the process proceeds to Step S22 in which whether the flag F1 is "1" is determined. When the film feed failure has occurred during the feed of the film, this flag F1 has been set to "1", so that the process proceeds to Step S23, otherwise this sub-routine is terminated.

In Step S23, the motor drive circuit 4 reverses the film feed motor M so as to wind the film 10 backward. Then, Step S24 is executed to conduct the initial reset sub-routine shown in FIG. 5.

Figure 5:
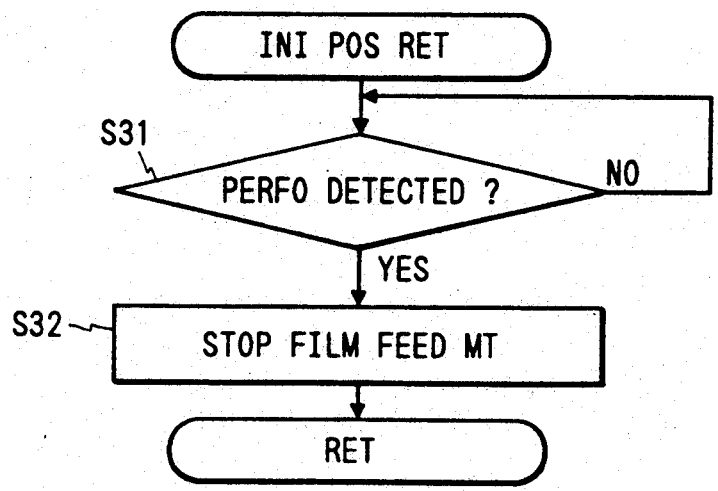
FIG. 5 is a flow chart showing a sub-routine for rewinding the film to set the frame on which interruption of the recording of photographing information has occurred back to the initial position.

Referring to FIG. 5, Step S31 determines whether a perforation 12 has been detected. It will be understood that, during the backward feed of the film from the position shown in FIG. 2B where the feed failure occurred, a perforation 12 is detected for the first time when the film has reached the initial position shown in FIG. 2A, i.e., the position at which the forward feed of the film 10 after the exposure of the frame 13b was commenced. When a perforation 12 is detected, the process proceeds to Step S32 in which the film feed motor M is stopped and the sub-routine is terminated. The process then returns to the program shown in FIG. 4. After the return, the process proceeds to Step S6 shown in FIG. 3 in which the recording of photographing information concerning the frame 13b is conducted again.

Figure 6:
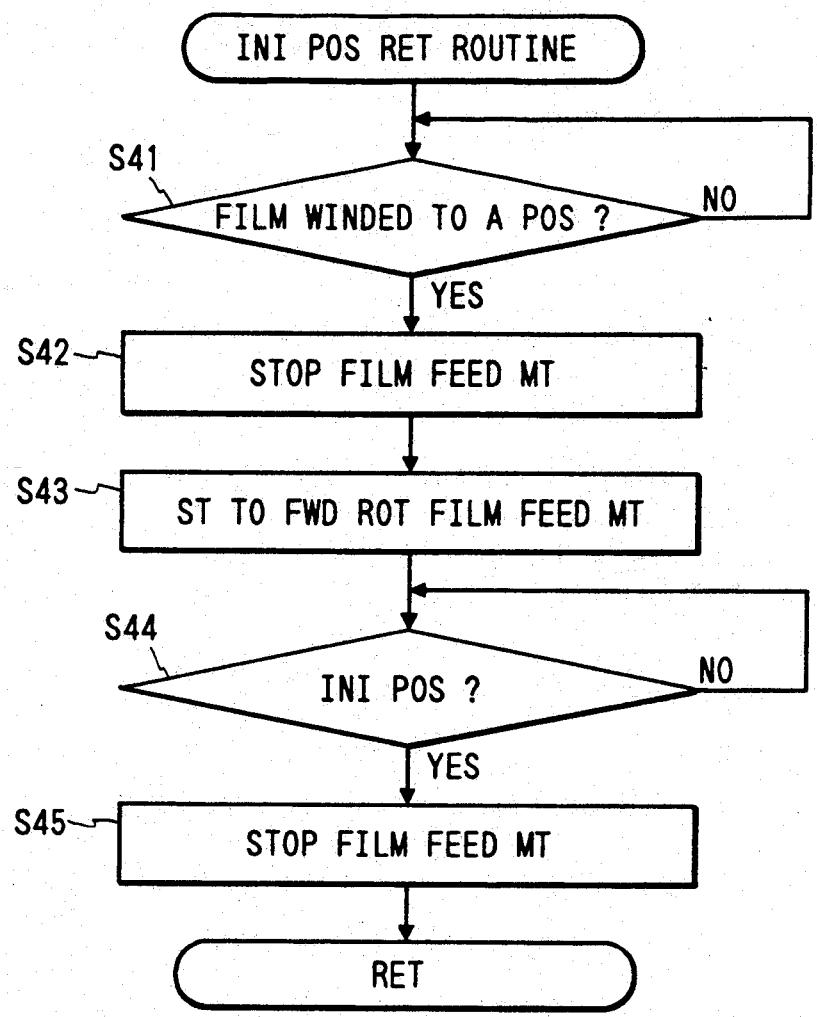
FIG. 6 is a flow chart showing another example of a subroutine for setting the frame back to the initial position.

The resetting of the film to the initial position may be effected by an alternative sub-routine shown in FIG. 6.

Referring to FIG. 6, Step S41 conducts backward feed of the film 10 until the frame 13c, which is ahead of the frame 13b on which the recording has been interrupted, is brought back to the photographing position. When the frame 13c has been set back to the photographing position, the process proceeds to Step S42 in which the film feed motor M is stopped. In Step S43, the film feed motor M is started to operate forward, i.e., to feed the film forward. Then, in Step S44, the feed of the film is continued until the frame 13b, with which the recording of the photographing information has been interrupted, is brought to the initial position shown in FIG. 2A. When the frame 13b has reached the initial position, the process proceeds to Step S45 in which the film feed motor M is stopped to terminate the sub-routine. The process then returns to the program shown in FIG. 4.

Thus, according to the program shown in FIG. 6, the film 10 is once fed backward until the frame 13c ahead of the frame 13b with which the recording of information has been interrupted is brought to the photographing position and then the film is fed in the normal cocking direction to reset the frame 13b to the initial position. It is therefore possible to avoid any over run of the frame 13b which may otherwise occur and cause the photographing information to be recorded at a position offset from the destined recording region 14b.

Figure 7:
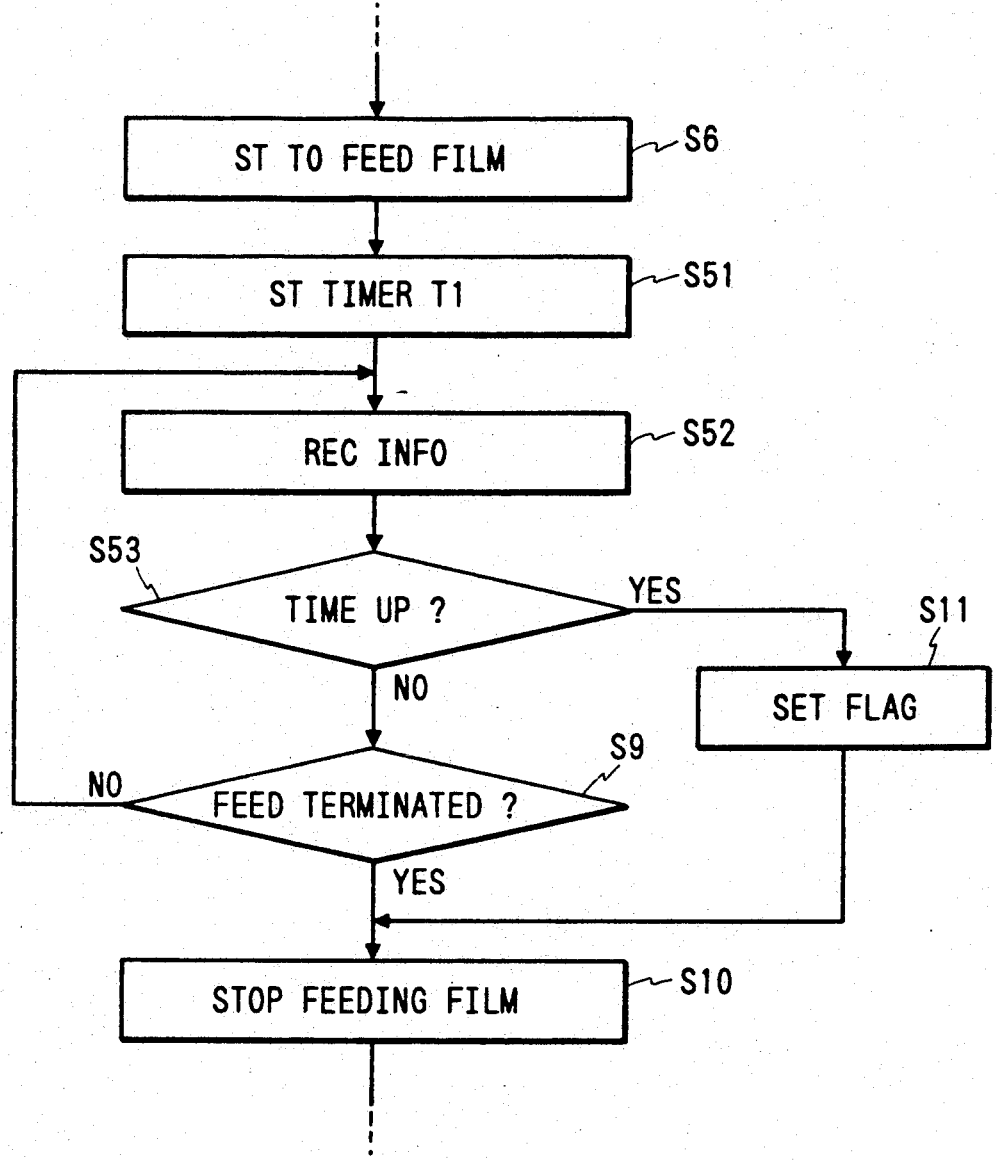
FIG. 7 is a flow chart showing a routine for sensing occurrence of film feed failure.

In the photographing information recording control program shown in FIG. 3, the occurrence of the failure of feed of the film 10 is detected through detection of abnormal voltage drop of the battery BAT or accidental opening of the battery cover. The occurrence of the film feed failure, however, may be detected on the basis of expiration of time, i.e., by detecting that the feed of the film has not been finished even after expiration of a predetermined film feeding time. This way of control will be described with specific reference to FIG. 7. In FIG. 7, the same reference numerals are used to denote the same steps as those appearing in the flow shown in FIG. 3, and detailed description of such steps is omitted.

After the exposure of the frame 13b, the feed of the film is commenced in Step S6. Then, in Step S51, the timer T1 is started. The timer T1 is set to operate for a period which is slightly longer than the time normally required for one-frame feed of the film 10. Then, recording of the photographing information is commenced in Step S52 and, in the subsequent step S53, whether the time set in the timer T1 has expired is determined. If the time has expired, the process proceeds to Step S11. In this case, since the feed of the film has not ceased in the expected time, it is determined that film feed failure has taken place. The flag F1 is therefore set. Conversely, if the time has not expired, the process proceeds to Step S9 confirming safe feed of the film.

The occurrence of a film feed failure may also be detected upon sensing any abnormal impact on the camera. Namely, the described process for recording photographing information may be performed in response to any shock applied to the camera. The described process also may be executed in the event of a film feed failure that resulted from causes other than those described, i.e., reasons other than abnormal voltage drop of the battery and accidental opening of the battery cover.

As will be understood from the foregoing description, according to the invention, any film feed failure occurring during recording of photographing information on the film which is being fed after an exposure is discovered through detection of, for example, voltage drop of the battery, accidental opening of the battery cover or expiration of the expected film feed time. After the removal of cause of the film feed failure, e.g., renewal of the battery, the film is fed backward at least by a length for bringing the frame with which the information recording was interrupted to the initial position. The information is then read from the memory and recorded once again on the frame which has been set back to the initial position. It is therefore possible to record photographing information on each exposed frame without fail, despite occurrence of any film feed failure.

Although a pre-wind type camera has been specifically mentioned, it will be clear to those skilled in the art that the invention can be equally applied to a normal-wind type camera.

In the described embodiment, the repeated recording of photographing information is conducted only on the fame with which the recording of information has been interrupted. This, however, is only illustrative and the invention can be modified such that, when a film feed failure has occurred, the film is completely fed back to bring the first or oldest frame to the initial or exposure position so as to rewrite the photographing information for each of the successive exposed frames.

It will be also clear from the foregoing description that the memory 5 m forms the photographing information storage means, while the recording circuit 3 and the magnetic head MH in cooperation provide the recording means. It will be also clear that the motor drive circuit 4 and the film feed motor M form the film feeding means, and that the film feed failure detection means is constituted by the battery voltage detection circuit 1, battery cover switch SW3 and the timer T1 Obviously, the control circuit 5 serves as the control means.

As has been described, the photographing information recording device of the present invention operates such that, when a film feed failure is detected during recording of photographing information on a frame of the film which is being fed, the film is fed back at least by a length to bring the frame with which the recording was interrupted back to the initial position and the recording of the information is conducted once again on that frame.

It is therefore possible to record, without fail, the photographing information on each of the exposed frames of the film.

What is claimed is:

1. A photographing information recording device for magnetically recording photographing information on a photographic film in a camera during feeding of said film, said device comprising:
   photographing information storage means for storing photographing information for each of a plurality of exposed frames of said film;
   recording means for recording photographing information read from said storage means on an information recording region of said film at each frame of said film during the feeding of said film;
   film feeding means for feeding said film forward and backward;
   film feed state detecting means for outputting a film feed failure signal upon sensing occurrence of a failure in the feeding of said film; and
   control means for controlling, in response to said film feed failure signal, said film feeding means and said recording means in such a manner as to cause said film feeding means to feed said film backward to an initial position where said recording means can conduct once again the recording of said photographing information from a starting end of the information recording region of an exposed frame with which the occurrence of the film feeding failure was sensed or of one of the plurality of exposed frames which are ahead of said exposed frame with which the occurrence of the film feeding failure was sensed, and as to cause said recording means to record photographing information read from said storage means once again on said information recording region from said starting end during a repeated forward feeding of said film.

2. A photographing information recording apparatus according to claim 1, wherein said film feed state detecting means includes a battery checker which provides said film feed failure signal upon sensing an abnormal voltage of a battery for driving said film feeding means.

3. A photographing information recording apparatus according to claim 1, wherein said film feed state detecting means includes a detector capable of producing said film feed failure signal upon detection a drop of a battery voltage for driving said film feeding means.

4. A photographing information recording apparatus according to claim 1, wherein said film feed state detecting means includes a timer capable of producing said film feed failure signal upon sensing expiration of a predetermined film feeding time.

* * * * *